April 12, 1960  C. E. POYNTER  2,932,240
SURFACE BROACHING

Filed July 13, 1953  2 Sheets-Sheet 1

INVENTOR
CYRIL E. POYNTER

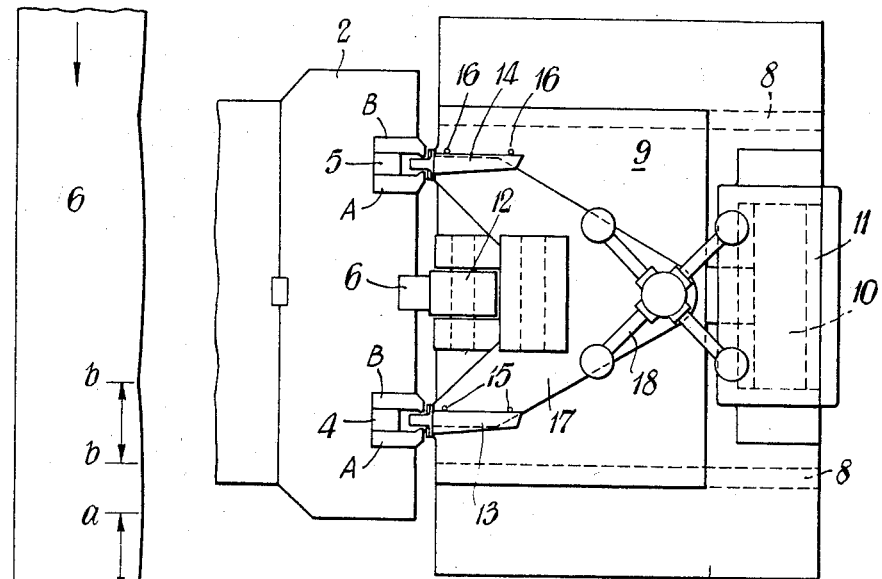
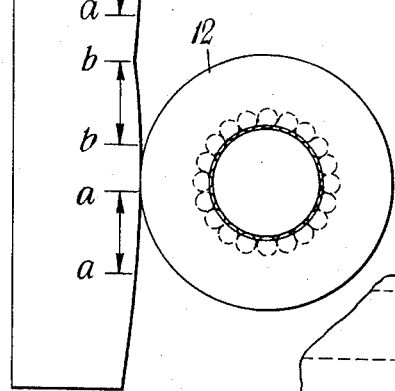
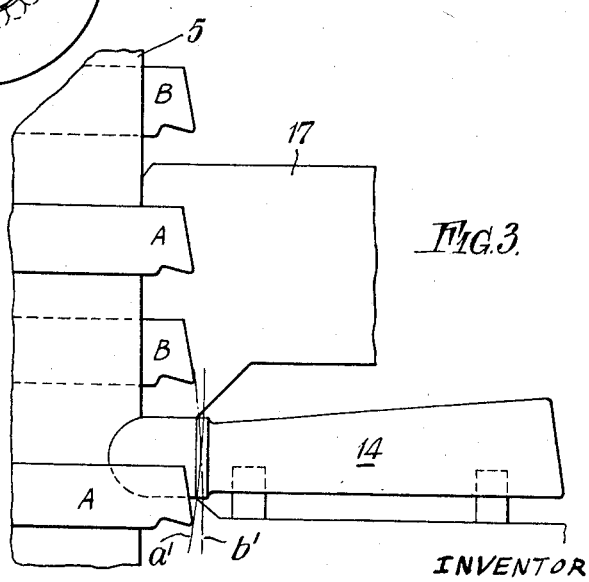
Fig. 2.
Fig. 3.
Fig. 4.
INVENTOR
CYRIL E. POYNTER

United States Patent Office 2,932,240
Patented Apr. 12, 1960

2,932,240

SURFACE BROACHING

Cyril Edward Poynter, London, England, assignor to Weatherley Oilgear Limited, London, England Application July 13, 1953, Serial No. 367,682

Claims priority, application Great Britain July 15, 1952

5 Claims. (Cl. 90—82)

This invention relates to an improved method of surface broaching and machines for performing the improved method.

The surface broaching of work pieces having other than plane faces in one operation presents serious difficulties, the surface broaching of curved faces is a particularly awkward problem.

In the case of arcuate curves it is possible to employ a tool-holder which is mounted for movement about a central pivot.

The present invention makes possible the surface broaching of non-uniformly curved surfaces or of a plurality of angularly disposed plane surfaces in a single operation.

The invention provides a method of surface broaching in which the workpiece is moved in controlled relationship to the straight line movement of each tooth of a broaching tool past the face of the work-piece to be broached so as to produce on that face a desired non-planar contour.

For the production of simple curved contours the movement of the workpiece is attained by the simple reciprocation of a work table to which it is clamped towards and away from the plane of the tool movement.

For the production of contours curved in more than one direction, the work table may be given a part-rotation movement simultaneously with the reciprocating movement.

Surface broaching machines according to the invention have a broach bar operating in a straight line and carrying at least one surface broaching tool, the pitch of whose teeth is greater than the length of the work-piece surface to be machined, a work table for carrying the workpiece and means operating in controlled relationship to the movement of each tooth of the tool past the workpiece to move the work table in relation to the plane of movement of the tool.

In preferred forms of machine the means for moving the work table is comprised by one or more rams or springs urging the table on a slide toward the plane of tool movement and cam plate means carried by the broach bar in fixed relation to the tool and co-operating with at least one roller or the like carried by the table.

Where a part-rotational movement is to take the place of or to be superimposed on the reciprocating movement of the work table, the table is carried on a vertical pivot and its rotation is controlled by a pair of spaced cam plate means co-operating with spaced rollers.

A machine for producing a pair of diverse concave surfaces on work pieces by the method according to the invention is illustrated in the accompanying drawings in which:

Fig. 2 is a plan view in partial section of the machine of Fig. 1.

Fig. 3 is a diagrammatic side elevation to an enlarged scale of one work-piece and of the teeth of the tool operating upon it.

Fig. 4 is a diagrammatic side elevation to an enlarged scale of a cam rail and roller forming part of the machine.

Fig. 5 is a plan view of another embodiment of the invention.

Figure 1:
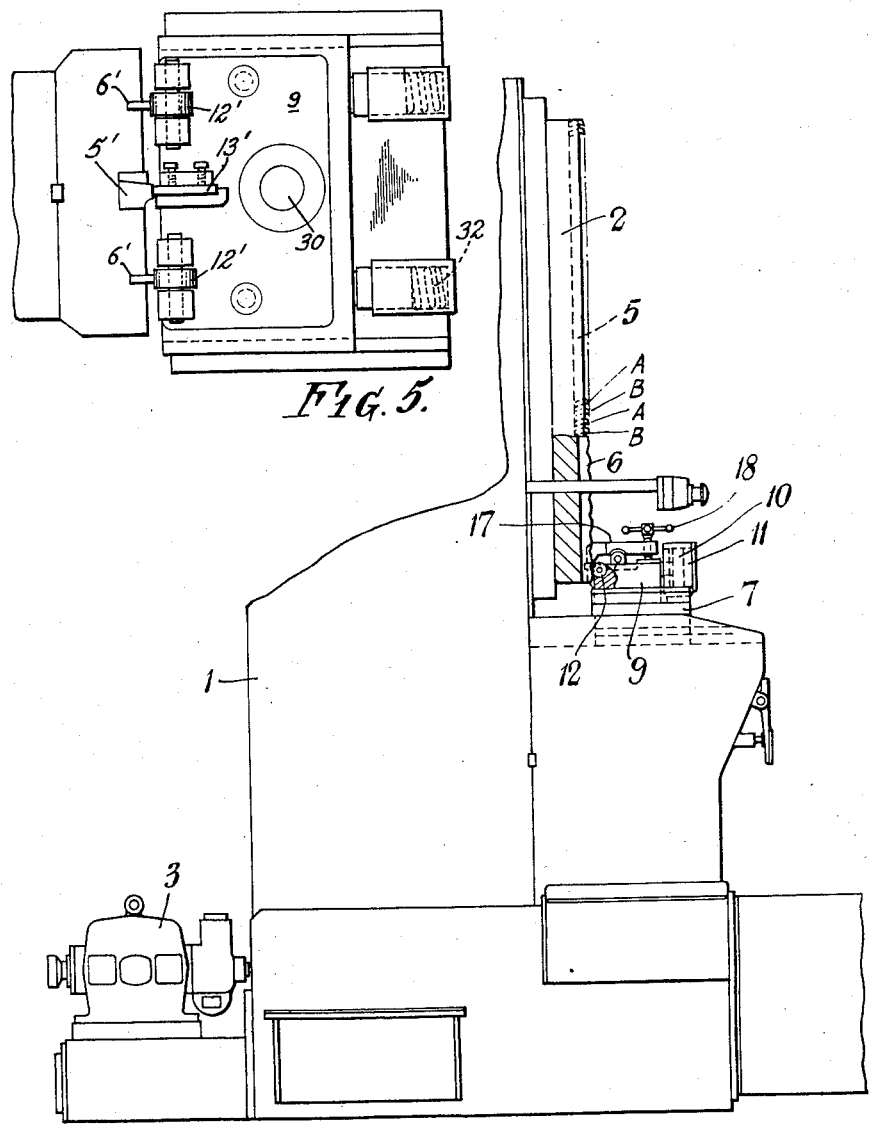
Fig. 1 is a side elevation in partial section of a complete machine.

The main elements of the machine are of conventional design and it is not deemed necessary to describe the parts in detail.

The machine has a frame 1 carrying a broach bar 2 for vertical reciprocation. The broach bar is driven by an hydraulic motor (not shown) which is supplied with pressure fluid by a pump 3.

The broach bar 2 carries two sets of broaching tools 4 and 5, each of which has a set of cutting teeth A and a second set of cutting teeth B.

Also carried by the broach bar 2 is a cam rail 6 located midway between the two sets of tools.

A forward extension of the frame 1 of the machine carries a work table 7 arranged to shuttle into and out of operative position on guide rails 8.

The table 7 includes an upper sliding fixture 9 resiliently urged by piston 10 in an hydraulic pressure cylinder 11 towards the broach bar 2.

A roller 12 carried by the sliding fixture 9 is in this way resiliently urged against the cam rail 6 when fixture 9 is in the operative position.

A pair of identical work pieces 13 and 14 are located against stops 15, 16 on the fixture 9 and are clamped by a clamp 17 manually operated by a handweel 18.

The sets of teeth A and B of each broaching tool are staggered in the manner shown in Fig. 3.

The pitch of the teeth of set A is two inches and so is the pitch of the teeth of set B, these pitches are greater than the length of the surfaces of the workpieces to be machined.

The working profile of the cam face of the cam rail 6 is so phased in relation to the cutting faces of the teeth of sets A and B that different concave cuts are made by the teeth of each set. This fact will be clear from the following description of the operation of the machine.

The work pieces 13 and 14 are located and clamped in position on the sliding fixture 9 with the work table 7 shuttled out to its furthest extent.

The table 7 is then shuttled forward into its operative position. The broach bar 2 is at this time at the top of its stroke and the roller 12 is resiliently pressed against the lowest working profile of the cam rail 6.

As the broach bar 2 descends on a working stroke the sliding fixture 9 carrying the work pieces 13 and 14 moves in and out in relationship to the position of the broach bar, such relationship being determined by the working profile of the cam rail 6.

This relationship is demonstrable by reference to Figs. 3 and 4 of the drawings.

The teeth of the sets of tools A are operative on the left hand (Fig. 2) faces of the work pieces while the roller 12 is in contact with the sections of the cam rail shown in Fig. 4 between the lines $a$, $a$; and the teeth of the sets of tools B are operative on the right hand (Fig. 2) faces of the work pieces while the roller 12 is in contact with the sections of the cam rail shown in Fig. 4 between the lines $b$, $b$.

As a result a concave curved cut represented by the line $a'$ (Fig. 3) is produced on the left hand faces of the work pieces, and a concave curved cut represented by the line $b'$, is produced on the right hand faces of the work pieces.

By making each successive tooth of a series progressively more protuberant to a predetermined degree than its forerunner, a succession of cuts of chosen depth is produced. Alternatively a similar effect can be obtained by making the successive working profiles of the cam rail 6 progressively less protuberant, so that the sliding fixture 9 approaches the tools to a progressively greater extent.

The work-piece movement related to the passage of each successive tooth are not necessarily similar in displacement or duration, but are varied to provide for efficient stock removals. Only the finishing cut or cuts necessarily follow the line of the desired contour.

To this end, the contour of the portion of the cam rail 6 controlling the movement of the sliding fixture 9 during the passage of the last tooth past the work is the exact reverse of the desired contour to be machined thereon.

For the production of more complex machined faces, which are curved in more than one plane, the machine of Fig. 1 can be modified as shown in Fig. 5 to permit the sliding fixture 9 to perform a rotational as well as a reciprocating movement.

For example the fixture 9 as shown in Fig. 5 is mounted on a vertical pivot 30, and the single cam rail 6 of Fig. 2 is replaced by a pair of co-operatively formed rails 6', opposite which a pair of rollers 12' replace the single roller 12. The tool bar 5' is located centrally to operate on a work piece 13' clamped in position facing tool bar 5'. The hydraulic cylinder is replaced by a pair of compression springs 32 operating on the sliding fixture towards its outer edges. With this construction more complex contoured surfaces may be machined.

I claim:

1. A surface broaching machine comprising a frame, a broach bar mounted on said frame for movement in a straight line, at least one broaching tool carried by said broach bar and having teeth spaced a greater distance from each other than the length of a workpiece surface to be machined, a fixture for carrying the workpiece and movably mounted on said frame for movement into and out of said straight line path of movement of said broach, and means for so determining the movement of said fixture, said means being so arranged that during the movement of said bar a contouring movement of said fixture takes place during the movement of each tooth of the tool past the workpiece to produce a selected non-planar contour on a face of the workpiece.

2. A surface broaching machine according to claim 1 in which said means includes means for resiliently urging the fixture towards the plane of movement of the bar, and cam plate means carried by the broach bar in fixed relation to the tool, and anti-friction cam follower means on the fixture and cooperative with said cam plate means.

3. A surface broaching machine according to claim 2 comprising two broaching tools carried by said bar for operation on a single workpiece, the teeth of said tools being arranged in staggered relationship, said cam plate means having cam surfaces for moving the workpiece fixture in relationship to the movement of the teeth of both tools for causing said teeth to perform cuts in predetermined paths on the workpiece.

4. A surface broaching machine according to claim 1 wherein the workpiece fixture has mounting means for both reciprocating movement to and from the plane of movement of the broach bar and for rotational movement relative to that plane, whereby curves of complex nature can be machined on the workpiece.

5. A surface broaching machine according to claim 4 in which said movement determining means includes means for resiliently urging the work fixture towards the plane of movement of the broach bar, a pair of cam rails carried in spaced relationship by said broach bar, and a pair of complementary cam follower means carried by said fixture and respectively cooperative with said cam rails.

References Cited in the file of this patent

UNITED STATES PATENTS

| | | |
|---|---|---|
| 1,528,872 | Colomb | Mar. 10, 1925 |
| 1,636,729 | Yarrington | July 26, 1927 |
| 2,002,924 | Romaine | May 28, 1935 |
| 2,018,185 | Morton | Oct. 22, 1935 |
| 2,041,551 | Lapointe | May 19, 1936 |
| 2,357,094 | Edgar | Aug. 29, 1944 |
| 2,358,225 | Gotberg | Sept. 12, 1944 |
| 2,732,825 | Grad | Apr. 3, 1945 |
| 2,397,917 | Burrill | Apr. 9, 1946 |
| 2,459,697 | Halborg | Jan. 18, 1949 |
| 2,553,966 | Groene | May 22, 1951 |
| 2,590,042 | Root | Mar. 18, 1952 |